April 8, 1958     E. D. ROCKAFELLOW     2,829,769
METALLIC PARTS COUNTER

Filed Sept. 19, 1955     3 Sheets-Sheet 1

INVENTOR.
ERNEST D. ROCKAFELLOW
BY
ATTORNEY

April 8, 1958 E. D. ROCKAFELLOW 2,829,769
METALLIC PARTS COUNTER

Filed Sept. 19, 1955 3 Sheets-Sheet 2

INVENTOR.
ERNEST D. ROCKAFELLOW
BY
ATTORNEY

United States Patent Office 2,829,769
Patented Apr. 8, 1958

2,829,769

METALLIC PARTS COUNTER

Ernest D. Rockafellow, Flint, Mich.

Application September 19, 1955, Serial No. 535,165

9 Claims. (Cl. 209—105)

This invention relates to a device for automatically positioning small articles to be counted and, more particularly, relates to a device which receives articles in an unoriented condition and discharges them in an oriented state through one or more paths in condition for counting.

A variety of automatic counting devices have been offered in the past, which devices have, in general, been satisfactory for the conditions under which they were designed to operate. However, the ever increasing production rates of modern automatic machinery requires correspondingly faster counting machines, which machines must, however, be capable of operating without loss in accuracy. Particularly, in the production of items manufactured in large numbers and at small unit profit, such as ball bearings, it is essential that counting machines operate at extremely high levels of speed and accuracy.

With most, if not all, types of counting devices, it is necessary that the articles to be counted be properly oriented in order for the counting device to operate satisfactorily. With many types of articles, the manufacturing process does not produce the articles in proper orientation for counting but rather produces a mass of unoriented articles. Other treatments of the articles to be counted may leave them in an unoriented condition unsuitable for counting. Separation and orientation of the articles prior to their movement through a counting device, therefore, is essential. Obviously, hand operations for orienting the articles is not only time consuming but may involve considerable expense. Prior machines for effecting such orientation and segregation, in general, have either been unsatisfactory in operation particularly at high speeds or have been too expensive or delicate for the average user.

Therefore, it is a principal object of the present invention to provide a device for positioning small articles, such as bearing balls, bearing seals, ball races, and components, for discharge through a plurality of paths and arrange them for convenient and accurate counting.

A further object of the invention is to provide such a device having relatively few moving parts and thereby lessening both the original cost and the cost of maintenance.

A further object of the invention is to provide a device, as aforesaid, which will be substantially fool-proof in operation.

A further object of the invention is to provide a device, as aforesaid, which is adaptable to use with many different types of counting devices.

A further object of the invention is to provide a device, as aforesaid, which utilizes a spinning disc which receives an unoriented mass of such articles and distributes them to a receiving and guiding means which arranges said articles in a single row, wherein the movements of said articles may be closely controlled for more efficient counting.

A further object of the invention is to provide a device, as aforesaid, which can be readily adjusted for handling articles of many different sizes without requiring either complex equipment or more than a minimum amount of "set-up" time.

A further object of the invention is to provide a device, as aforesaid, wherein the mechanism for adjusting the machine to handle articles of different sizes is simple and does not unduly complicate the operation of the article positioning mechanism.

Other objects and purposes of the invention will be apparent to persons acquainted with apparatus of this general type upon reading of the following disclosure and examining the accompanying drawings, in which.

General description

In general, the invention comprises a rapidly spinning disc positioned at the bottom of a generally cup-shaped chamber. A plurality of outlets each communicate with the interior of said chamber and with a generally enclosed passageway, which passageway leads to a suitable receptacle for said articles. Any convenient type of counter, mechanical, electrical or opto-electrical, may be arranged for recording the number of articles discharged through each of said passageways.

Detailed description

Figure 1:
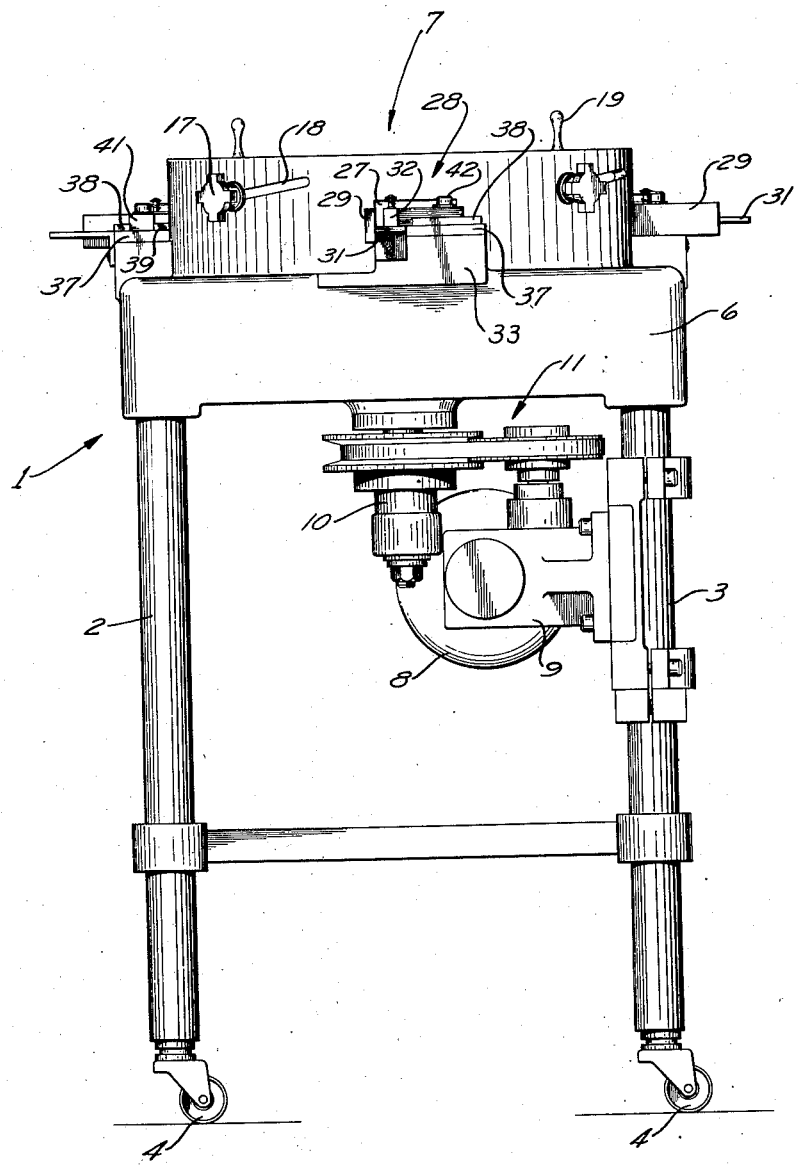
Figure 1 is a front elevation view of a machine embodying the invention.

Referring now to Figure 1 there is shown a frame 1 of convenient form including legs 2 and 3 supported on any convenient type of floor contacting devices, such as casters 4. The orienting device of the invention includes a base 6 supported on the upper ends of the legs and, in turn, supporting a sorting device 7. A motor 8 mounted by a bracket 9 onto one of the legs, as the leg 3, drives a shaft 10 through the sheave and V-belt arrangement indicated generally at 11. Preferably, speed adjustment means are also provided for said V-belt arrangement 11, which means can be of any conventional type and need no detailing here.

Figure 2:
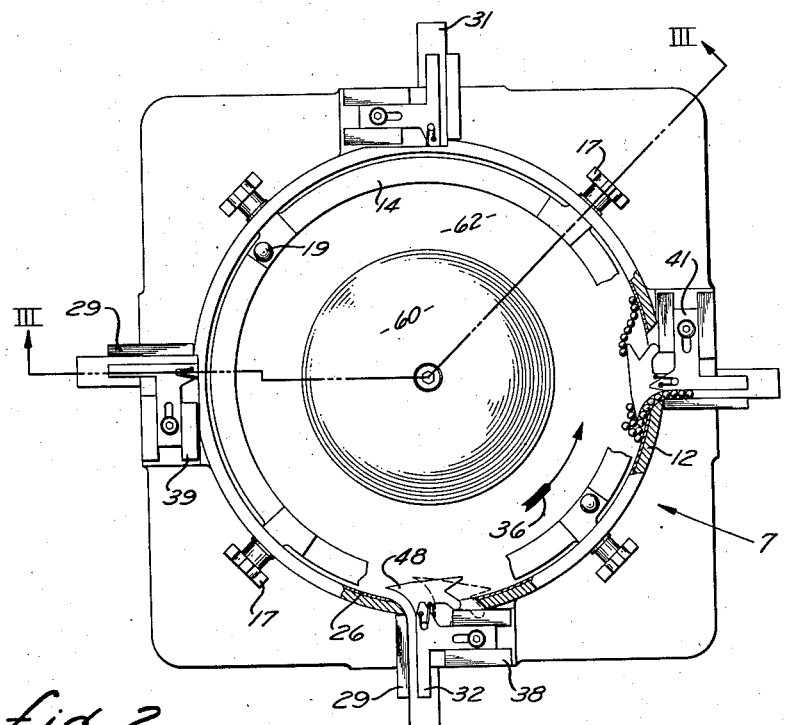
Figure 2 is a top plan view, partially broken, of the machine shown in Figure 1.
Figure 4:
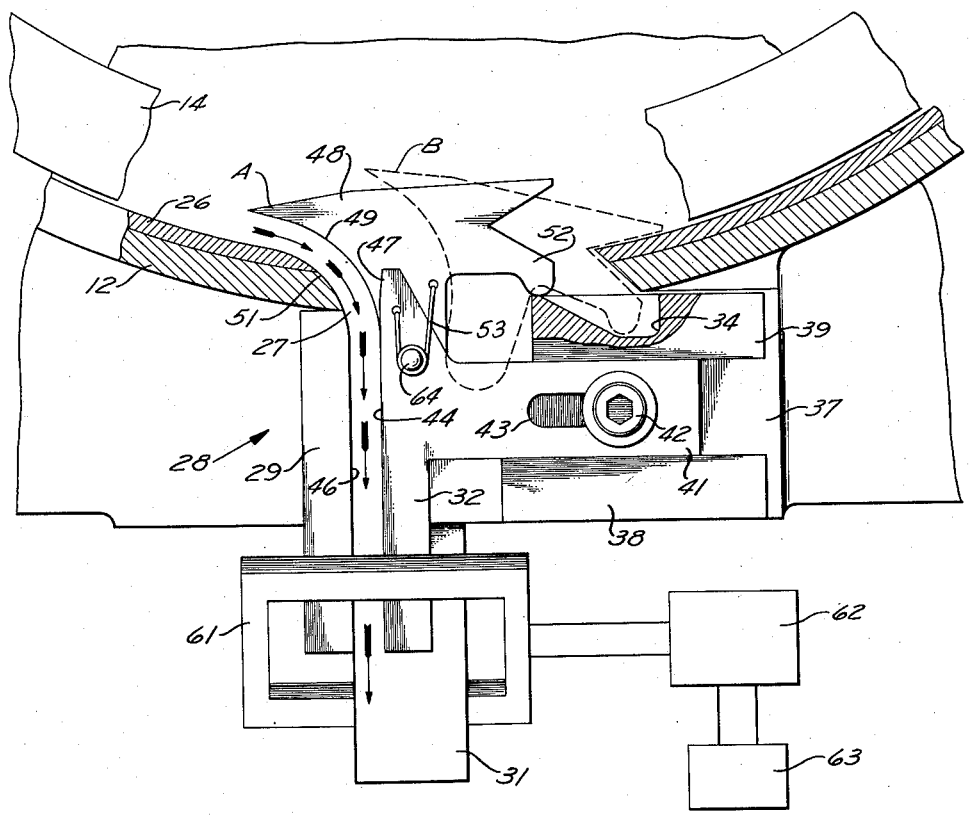
Figure 4 is an expanded view of a fragment of Figure 2 showing a discharge outlet and schematically showing a counting device associated therewith.

The sorting device 7 comprises a cylindrical wall 12 extending upwardly from said base and defining a sorting chamber 13. The inside surface of wall 12 is preferably provided with a lining 26 (Figures 2 and 4) of suitable material, such as suitable fiber and/or plastic material. A control ring 14 is located within said sorting chamber, adjacent the wall 12. The control ring has a wear plate 14a on the bottom surface thereof. Said control ring is supported on the wall 12 by the shafts 16 which shafts have threaded end portions. Said shafts 16 extend through angularly positioned slots 18 (Figure 1) provided in the wall 12. Knobs 17 engage the threaded portion of shafts 16. Washer 17a is mounted about each of the shafts 16 between the knob 17 and wall 12. The knobs are adapted to be rotated on the shafts 16 between positions where the knob frictionally grips the external surface of wall 12 by means of a washer 17a and a position where the knobs 17 and shafts 16 are free to move in slots 18 circumferentially relative to the wall. Handles 19 are secured to ring 14 so that it may be manually rotated relative to wall 12, to the extent permitted by slots 18 until it reaches the position giving the desired clearance between the lower surface of plate 14a and the upper surface of disc 62. Suitable manipulation of the knobs 17 will then clamp the ring 14 in a predetermined, non-rotating position with respect to the wall 12. The angular arrangement of the slots 18 provides for upward and downward movement of the ring 14 with respect to the wall 12 and disc 62 so that articles of different sizes can be processed in the orienting device.

A spinner structure 21 (Figure 3) is positioned concentrically within the chamber 13. The spinner structure includes a somewhat dome-shaped member 60 and a disc 62, which disc extends into close proximity to wall 12 beneath the ring 14. Said spinner structure is supported on and rotated by the shaft 10 which shaft is driven by the motor 8 in the manner above set forth. Said shaft is supported in and by suitable bearing structures 23.

A plurality of discharge openings 27 (Figure 1) are provided at spaced intervals along the wall 12 and are each fitted with a guide mechanism 28. The guide mechanism 28 includes a discharge chute which is defined generally by a fixed wall 29, a fixed base 31 and a movable wall 32.

A boss member 33 is provided adjacent each of the discharge openings and is located in any convenient manner on a suitable support, here shown as being integral with and extending upwardly from the base 6. A spacer 37 is affixed to the boss 33 for presenting a mounting surface slightly above the upper surface of boss member 33 and above the fixed base 31.

A pair of spaced, parallel slider guides 38 and 39 are affixed to the upper surface of spacer 37 and extend toward the fixed wall 29. A recess 34 is formed in the radially inner edge of guide 39 for the purposes appearing hereinafter. The recess 34 extends radially outwardly with respect to the wall 12 and as well as circumferentially along in the direction of rotation of the spinner structure which is indicated by the arrow 36 in Figure 2. A slider 41 is received between said guides 38 and 39 for movement with respect thereto and is capable of being fixed in position with respect thereto by the nut 42 acting on a bolt extending through the elongated slot 43 in the slider 41. Movable wall 32 is affixed to the end of the slider 41.

Figure 3:
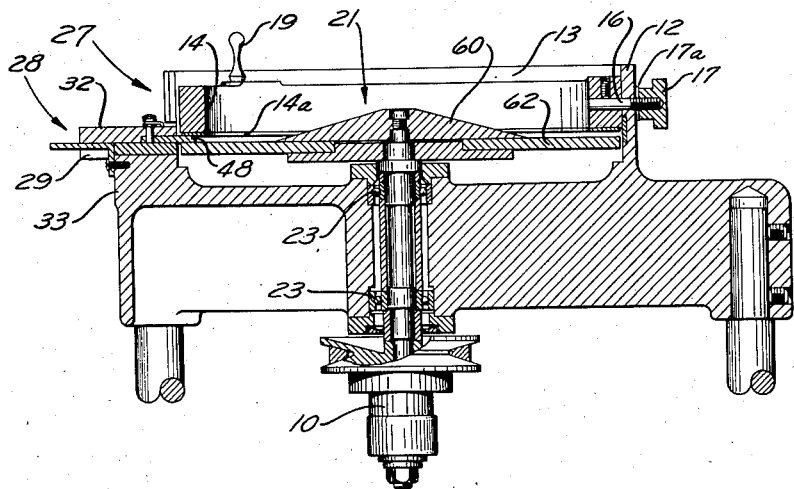
Figure 3 is a sectional view taken along the line III—III of Figure 2.

Said movable wall has a surface 44 thereon parallel to the surface 46 of the fixed wall 29 and also has a guide support 47 (Figure 4) thereon extending radially inwardly toward the center of the spinner structure 21 and into the opening 27. An article guide 48 is pivotally mounted by pin 64 on guide support 47 and lies above the edge of the disc 62 (Figure 3). The article guide 48 has an article deflecting wall 49 thereon substantially parallel with the curvature of the opposed wall 51, said opposed wall 51 being defined by curvature of the lining 26 and the wall 12 adjacent opening 27. Said guide 48 is also provided with a position controller 52 arranged for extending into the guide opening 34. A spring 53 is connected at one end to guide support 47 and at the other end to the article guide 48 and constantly urges the position controller 52 into engagement with the wall of recess 34, which wall forms a cam surface. Thus, as slider 41 is moved rightwardly or leftwardly as appearing in Figure 4, with the spring 53 constantly holding the position controller 52 against the wall of the recess 34, the guide 48 will successively occupy positions whose extremes are indicated by the solid line A and by the broken lines B in Figure 4. Thus, the guide 48 may be arranged to intercept articles of any predetermined diameter as the articles travel around the periphery of the chamber 13 to direct the particles, preferably one at a time, outwardly through the opening 27 and thence through the discharge chute into a suitable receptacle. Adjustment of the position of ring 14 will determine the maximum height of the articles passing out through the opening 27.

Any convenient counting device may be placed adjacent the outward end of said discharge chute. One convenient type of counting device comprises that disclosed in the application of Stuart C. Rockafellow, Serial No. 483,250, filed January 21, 1955. Briefly this consists of an electrically conductive coil 61 placed around, or at least adjacent, the discharge chute, said coil being connected to an oscillatory circuit such that passage of an article past or through the coil will modify the oscillatory relationships of the circuit sufficiently to provide a pulse, which pulse may then actuate a counting device. The oscillatory circuit is indicated generally at 62 and a counting device responsive to the changes in the output of the oscillatory circuit is indicated generally at 63.

Obviously, however, other types of counting devices may be used, if desired.

It will be seen that the wall 12 is provided with a plurality, here four, of outlets 27 together with the mechanism for controlling the size of the article moving through the opening. Each opening is provided with independently operating counting devices. Further, it will be recognized that several sizes of articles may be segregated and discharged through the several openings, and counted separately since the counting device working in connection with one discharge opening may operate independently of the counting device working at another of the discharge openings.

*Operation*

While the operation of the device is believed clear in view of the foregoing, it will be briefly summarized for completeness. A mass of un-oriented articles is deposited in chamber 13. As the spinner structure 21 rotates, centrifugal force will urge the articles radially outwardly. Articles whose height is too great will be prevented from moving into contact with wall 12 by ring 14. Articles passing under the ring will travel along the inner surface of wall 12 and if, depending on the setting of article guide 48, they are of proper size will pass through the openings 27. Articles not passing through one of the openings 27 may pass out through others of the openings 27 if such openings are set to accommodate such sizes. It should be noted that adjustment of the position of slider 41 causes simultaneous adjustment of the position of the article guide 48 and of the movable wall 32. Thus, a single adjustment of slider 41 provides the proper setting of the size of the discharge opening and of the size of the discharge chute.

If desired, all or any number less than all of the openings 27 may be used.

Passage of the articles through the openings 27 and along the discharge structure may be promoted by use of air blasts or other means, if desired.

Although a particular, preferred embodiment of my invention has been disclosed herein for illustrative purposes, it will be understood that variations or modifications thereof which do not depart from the scope of such invention, and the above disclosure thereof, are fully contemplated unless specifically stated to the contrary in the appended claims.

I claim:

1. In a device for preparing a mass of unoriented articles for counting, the combination comprising: a cylindrical sidewall and a bottom wall defining a chamber; a spinner structure mounted in said chamber for rotation relative thereto, said spinner structure including a rotatable disc whose outer edge extends into close proximity to said sidewall; a plurality of substantially equally spaced discharge outlets through said sidewall; a control ring mounted on the inside surface of said sidewall, said control ring lying above and spaced from the radially outer portion of said disc; guide mechanism adjacent each of said outlets, said guide mechanism being in fixed position relative to said sidewall, each said guide mechanism including article guide means extending through said outlet and into said chamber, a part of said guide means lying in the space between said control ring and the radially outer portion of the disc, said guide means having a deflecting surface arranged to intercept and deflect articles as they move along said sidewall, said guide means being pivotally mounted on said guide mechanism so that said deflecting surface may be positioned at various locations in said discharge outlet whereby the size of articles passing through said discharge outlets may be controlled.

2. In a device for preparing a mass of unoriented articles for counting, the combination comprising: a cylindrical sidewall and a bottom wall defining a chamber; a spinner structure mounted in said chamber for rotation relative thereto, said spinner structure including a rotatable disc whose outer edge extends into close proximity to said sidewall; a plurality of substantially equally spaced discharge outlets through said sidewall; a plurality of angularly directed slots through said sidewall intermediate said outlets; a control ring mounted on the inside surface of said sidewall, said ring including shafts extending through said slots, means on said shafts for clamping said control ring in fixed position on said sidewall, said control ring lying above and spaced from the radially outer portion of said disc; guide mechanism adjacent each of said outlets, said guide mechanism including a fixed wall, a fixed base and a movable slider, guide means for said movable slider; an article guide pivotally mounted on said movable slider, said article guide extending through said outlet into said chamber, a part of said guide lying between said control ring and said disc, said article guide having a curved deflecting surface adapted to intercept and deflect articles as they move along said sidewall, said guide having formed thereon a position controller which engages a cam surface formed on said guide mechanism, resilient means urging said position controller into contact with said cam surface, whereby movement of said slider causes pivoted movement of said article guide relative to said outlet to control the cross-sectional area of said outlet.

3. In a device for preparing a mass of unoriented articles for counting, the combination comprising: means including a side wall defining a chamber; a spinner structure including a rotatable disc whose outer edge extends into close proximity to said side wall; a discharge outlet through said side wall; guide mechanism adjacent said outlet, said guide mechanism including article guide means extending through said outlet into said chamber and lying above and adjacent to the upper surface of said disc, said article guide means having an arcuate wall extending in a direction opposite to the direction of rotation of said disc and arranged to intercept articles carried on the periphery of said disc and direct said articles into said guide mechanism; and means for pivotally mounting said article guide means on said guide mechanism so that said arcuate wall may be positioned at various locations in said discharge outlet whereby the size of articles passing through said discharge outlet may be controlled.

4. The combination of claim 3 wherein said guide mechanism includes a pair of side walls and a base wall, said article guide means being pivotally mounted on one of said side walls; means supporting said one side wall for movement with respect to said chamber and for locking said one side wall in adjustable fixed position with respect to said chamber; and means fixed with respect to said chamber acting on said article guide means for causing pivotal movement thereof with respect to said one wall when said one wall is moved with respect to said chamber.

5. The combination of claim 4 wherein said means for causing pivotal movement of said article guide means includes a cam surface fixed with respect to said chamber; a cam follower on said article guide means and spring means urging said cam follower into contact with said cam surface.

6. In a device for preparing a mass of unoriented articles for counting, the combination comprising: a cylindrical side wall defining a chamber; a spinner structure mounted in said chamber for rotation relative thereto, said spinner structure including a rotatable disc whose outer edge extends into close proximity to said side wall; a plurality of discharge outlets through said side wall; a control ring mounted within said chamber, said control ring lying above, and spaced from, the radially outer portion of said disc; guide mechanism adjacent each of said outlets, each said guide mechanism including article guide means extending through said outlet and into said chamber, a part of said article guide means lying in the space between said control ring and the radially outer portion of the disc, said article guide means having a deflecting surface arranged to intercept and deflect articles as they move along said side wall, said article guide means being pivotally mounted on said guide mechanism so that said deflecting surface may be positioned at various locations in said discharge outlet whereby the size of articles passing through said discharge outlets may be controlled.

7. In a device for preparing a mass of unoriented articles for counting, the combination comprising: a cylindrical side wall defining a chamber; a spinner structure mounted in said chamber for rotation relative thereto, said spinner structure including a rotatable disc whose outer edge extends into close proximity to said side wall; a discharge outlet through said cylindrical side wall; guide mechanism adjacent said outlet, said guide mechanism including a movable side wall extending outwardly from said outlet and an article guide means extending through said outlet and into said chamber, said article guide means being located above, and adjacent the upper surface of, said disc and having an arcuate wall curved in a direction opposite to the direction of rotation of said disc and arranged to intercept articles carried on the periphery of said disc to direct said articles into said guide mechanism, the radially outer end of said arcuate wall lying adjacent said movable side wall of said guide mechanism; and means for moving said movable side wall and said arcuate wall substantially tangentially of said chamber and for moving said arcuate wall toward and away from said cylindrical side wall.

8. The combination of claim 7 including a plurality of discharge outlets through said cylindrical side wall, each of said outlets having a guide mechanism adjacent thereto; the movable side wall of the respective guide mechanisms being mounted for individual sliding movement tangentially with respect to the chamber; means pivotally mounting the article guide means of the respective guide mechanisms on the movable side wall thereof; and means for causing said arcuate wall to pivot on said movable side wall toward and away from said cylindrical side wall in response to sliding movement of said movable side wall.

9. In a device for preparing a mass of unoriented articles for counting, the combination comprising: a cylindrical side wall defining a chamber; a rotatable disc within said chamber whose outer edge extends into close proximity to said side wall; a plurality of discharge outlets through said side wall; guide mechanism adjacent each of said outlets, each said guide mechanism including a fixed side wall, a fixed base wall and a movable side wall; means supporting said movable side wall for sliding movement substantially tangentially of said chamber; an article guide pivotally mounted on said movable side wall, said article guide extending through the adjacent outlet into said chamber with said article guide lying above, and adjacent to, the peripheral portion of said disc; said article guide having a curved deflecting surface extending in a direction opposite to the direction of rotation of said disc and arranged to intercept articles as they move along said side wall and deflect them into said guide mechanism; means for pivoting said article guide on said movable side wall toward and away from said cylindrical side wall in response to sliding movement of said movable side wall; and means within said chamber above, and spaced from, said article guide and said disc for limiting the articles fed to the article guide to those having less than a predetermined vertical dimension; and means for adjusting the vertical position of said last mentioned means.

References Cited in the file of this patent

UNITED STATES PATENTS

| | | |
|---|---|---|
| 671,646 | Bailey | Apr. 9, 1901 |
| 2,437,721 | Borganz et al. | Mar. 16, 1948 |
| 2,532,760 | Davies | Dec. 5, 1950 |
| 2,582,007 | Christiansen | Jan. 8, 1952 |
| 2,594,337 | Noe | Apr. 29, 1952 |

FOREIGN PATENTS

| | | |
|---|---|---|
| 75,279 | Austria | Jan. 25, 1919 |